United States Patent Office 2,795,584
Patented June 11, 1957

2,795,584

HYDROCARBON SOLUBLE PHTHALOCYANINES

Tellis A. Martin and David I. Randall, Easton, Pa., assignors to General Aniline & Film Corporation, New York, N. Y., a corporation of Delaware No Drawing. Application July 17, 1953,
Serial No. 368,843

13 Claims. (Cl. 260—314.5)

This invention relates to the production of novel compounds of the phthalocyanine series.

In our U. S. Patent No. 2,547,972 there is disclosed and claimed a hydrocarbon-soluble metal phthalocyanine containing 1 to 6 amino methyl groups as nuclear substituents in the benzene rings of the phthalocyanine nucleus, said amino methyl groups having not more than one hydrogen attached to the nitrogen atoms thereof, and wherein the other radicals attached to the amino methyl groups contain no water-solubilizing groups, and at least one of said radicals contains at least 4 carbon atoms, in addition to its method of production by heating a chloromethylated metal phthalocyanine at a temperature of 100 to 160° C. with a monoamino compound containing at least one hydrogen attached to the amino hydrogen and containing no water solubilizing groups, in an amount at least equivalent to the chlorine contained in the chloromethyl groups of the phthalocyanine.

The compounds disclosed and claimed in said patent, while possessing in general excellent properties with respect to light fastness, color and solubility in certain solvents, are not entirely satisfactory for certain applications. For example, they do not have a sufficiently high solubility in gasoline for certain purposes. Further, their range of colors is somewhat limited. Applicants have solved this deficiency by providing, in accordance with the instant invention, phthalocyanine derivatives having a higher solubility in gasoline and a much wider range of colors from greenish-blue to greenish-yellow.

The compounds of this invention are novel phthalocyanine derivatives which may be described as phthalocyanines containing at least one aminomethyl group as a nuclear substituent of a pendant aryl nucleus attached to a phenylene nucleus of the fundamental phthalocyanine nucleus, said aminomethyl group having no more than one hydrogen attached to the nitrogen atom thereof and wherein the other radicals attached to the aminomethyl group contain no water-solubilizing groups, and at least one of said radicals contains at least four carbon atoms. Said pendant aryl nucleus may be attached to said phenylene nucleus of the fundamental phthalocyanine nucleus directly or through a bridging link.

The aforementioned compounds have the following formula:

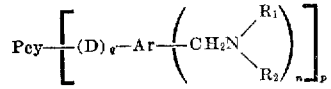

in which Pcy represents a fundamental phthalocyanine nucleus, D is a divalent bridging link, $q$ has a value of 0 or 1, Ar represents a pendant aryl nucleus comprising no more than 10 cyclic carbon atoms, $R_1$ is a radical devoid of water-solubilizing substituents selected from the group consisting of hydrogen, alkyl, aralkyl, aryl, cycloalkyl, and heterocyclic radicals and part of a cycle when taken together with $R_2$, $R_2$ is a radical of at least four carbon atoms, devoid of water-solubilizing substituents, and selected from the group consisting of alkyl, aralkyl, aryl, cycloalkyl, and heterocyclic radicals, and part of a cycle when taken together with $R_1$, $n$ has a value of 1 to 2, and $p$ has a value of 1 to 8.

The compounds of this invention may be produced by reacting a suitable phthalocyanine compound containing a chloromethylated pendant aryl nucleus attached directly or through a divalent bridging link to a phenylene nucleus of the fundamental phthalocyanine nucleus, with a suitable primary or secondary amine, which reaction may be depicted as follows:

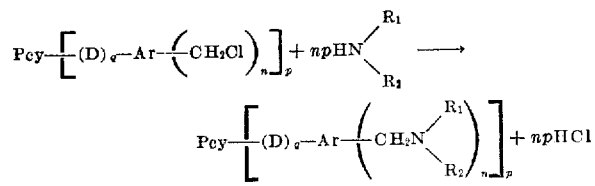

in which the various characters have the values given above.

The fundamental phthalocyanine nucleus (Pcy) in the above formula may be derived from a metal-free phthalocyanine or from metallic phthalocyanines such as copper, zinc, aluminum, tin, manganese, nickel and iron phthalocyanines and the like.

As stated above, the pendant aryl nucleus (Ar) in the above formula may be attached to a phenylene nucleus of the fundamental phthalocyanine nucleus directly or through a divalent bridging link (D) in the above formula. Examples of monoatomic or diatomic bridging links by which the pendant aryl nucleus may be attached to a phenylene nucleus of the fundamental phthalocyanine nucleus are —S—, —O—, —CO—, —SO₂—, —CH₂S—, —CH₂SO₂—, —CH₂O—, —CH₂CO—, —SO₂CH₂—, —SO₂NR—, —NRCO—, —NRSO₂—, —SO₂O—, and the like, wherein R stands for hydrogen or a hydrocarbon radical such as methyl, ethyl and the like. The pendant aryl nucleus may be benzene or naphthalene, unsubstituted or substituted by lower alkyl radicals such as methyl and/or ethyl. Phthalocyanine derivatives containing such pendant aryl nuclei and their methods of manufacture are per se known and no claims thereto are made herein.

The phthalocyanine precursors of the compounds of the instant invention, substituted by pendant aryl nuclei, may be chloromethylated in known manner, as for example according to procedures disclosed in U. S. Patents 2,435,307, 2,542,327 and 2,542,328, for example by condensation of the phthalocyanine at elevated temperatures in the presence of aluminum chloride, and preferably in the presence of a tertiary amine not susceptible to chloromethylation, with symmetrical bischloromethyl ether or a reactant such as paraformaldehyde which reacts like bischloromethyl ether in the presence of aluminum chloride. The phthalocyanine compound may be also chloromethylated by reaction with bischloromethyl ether in the presence of sulfuric acid or methyl hydrogen sulfate, or in other known manner.

In general, no more than two pendant aryl nuclei may be introduced into any one of the four phenylene nuclei of the fundamental phthalocyanine nucleus, for a maximum of 8 pendant aryl nuclei ($p$ in the above formula), and no more than two chloromethyl groups ($n$ in the above formula) may be introduced into any one of the pendant aryl nuclei, for a maximum of 16 chloromethyl groups ($n$ times $p$ in the above formula).

The resulting chloromethylated phthalocyanine derivative containing, for example, 1 to 16 chloromethyl groups per molecule, is reacted with a primary or secondary amine by heating therewith to form the secondary or tertiary aminomethyl-containing phthalocyanine derivatives of the invention. The latter reaction can be conveniently carried out in the presence of a large excess of the reagent amine, which thus serves as a reaction medium and also as an acceptor for hydrogen chloride formed in the reaction. Alternatively, an inert solvent can be used as the reaction medium, the amount of amine being, in this case, approximately equivalent to the halogen contained in the chloromethyl groups of the chloromethylated phthalocyanine derivative. An alkaline material such as an alkali metal carbonate is advantageously included in the latter reaction mixture as a hydrogen chloride acceptor.

The compounds produced in the aforesaid manner can be precipitated from the reaction mixture by addition of a solvent miscible with the reaction medium but which the secondary or tertiary aminomethylated phthalocyanine derivative is insoluble. Such a precipitant is, for example, ethanol, or if the reaction medium is a water-soluble amine, water can be employed. The product thus precipitated is filtered out, washed with the precipitant liquid, or another liquid in which it is insoluble, such as acetone. Further purification can be effected by dissolving in a hydrocarbon solvent, filtering the solution, concentrating the filtrate, and reprecipitating the product by diluting with acetone or ethanol.

The amines employed in preparing the secondary and tertiary aminomethyl-containing phthalocyanine derivatives of the invention are primary and secondary monoamines and heterocyclic mono—NH— bases containing at least 4 carbon atoms and having no water-solubilizing substituents (e. g. $SO_3H$, COOH, or OH groups) in the radical or radicals attached to the amino nitrogen. The nitrogen substituents of the amines include alkyl, aralkyl, aryl, cycloalkyl and heterocyclic radicals, as well as monocyclic or acyclic divalent radicals forming heterocyclic bases with the —NH— group. Such primary and secondary amines include, for example, butyl-, amyl-, hexyl-, heptyl-, octyl-, nonyl-, decyl-, dodecyl-, and stearylamines, diethyl-, dipropyl-, dibutyl-, diisobutyl-, diamyl-, dihexyl-, diheptyl-, dioctyl-, dinonyl-, didecyl-, didodecyl-, distearyl-, benzylmethyl-, dibenzyl-, di-(2-ethylhexyl), cyclohexyl-, dicyclohexyl-, and naphthylamines. Further, the amines include aniline, toluidine, anisidine, N-ethylaniline, N-butylaniline, 4-dodecylaniline, 4-hexylaniline, benzyldodecylamine, 4-methoxybenzylbutylamine, α-furfuryl-ethylamine, α-naphthylmethylaminomethane, and as heterocyclic bases, morpholine, piperidine, 1,2,3,4-tetrahydroquinoline, 1,2,3,4-tetrahydroisoquinoline and 2-methylmorpholine.

Reference is herewith made to U. S. Patents 2,430,052, 2,456,274, 2,479,491, 2,542,327, 2,542,328 and 2,124,299 and British Patents 589,118 and 565,200 for disclosures of metal and metal-free phthalocyanine starting compounds useful in the process of this invention, containing a pendant aryl nucleus attached directly or through a linking atom or group of atoms to a phenylene nucleus of the fundamental phthalocyanine nucleus.

The products of this invention have improved solubility in hydrocarbon solvents such as gasoline, petroleum ether, benzene and the like, those containing from 6 to 16 solubilizing aminomethyl groups being preferred for this purpose. Such preferred products are those corresponding to the formula given above in which $q$ has the value of 1, $p$ has a value of 4 to 8, and $n$ has a value of 1.5 to 2. Products containing relatively long and/or highly branched chain alkyl groups on the nitrogen in the aminomethyl groups are desirable for similar purposes. The products of the invention are also characterized by a wider range of colors from greenish-blue to greenish-yellow of excellent fastness to light. They are likewise useful for the coloration of oily printing inks, and hydrophobic vinyl resins such as polystyrene. The following examples are illustrative of the instant invention and are not to be regarded as limitative.

*Example I*

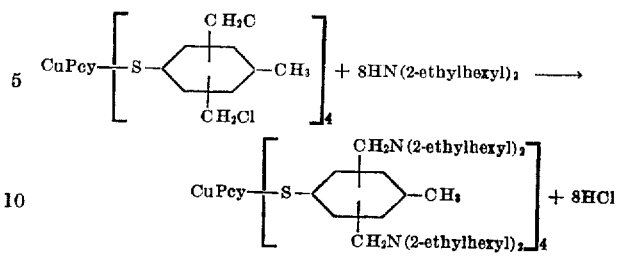

A mixture of 0.5 g. of copper tetra(bis-x,x-[chloromethyl]-4-tolylmercapto) phthalocyanine, 3 g. of di(2-ethylhexyl)amine, 0.5 g. of soda ash, and 50 ml. of dry dichlorobenzene was heated at 130–150° C. for four hours. At the end of this period a complete greenish-yellow solution had resulted. When cooled to 60–80° C., this solution was diluted with 20 ml. of ethanol, filtered, washed first with ethanol and then with water, yielding 0.7 g. of greenish-yellow solid product. It dissolves very readily in gasoline, benzene, petroleum ether and the like. It is useful as a dyestuff for plastics and inks, and the like.

The starting phthalocyanine employed in this example may be prepared by reaction of 8 moles of bischloromethyl ether with 1 mole of copper tetra-4-(p-tolylmercapto)-phthalocyanine (U. S. 2,456,274).

*Example II*

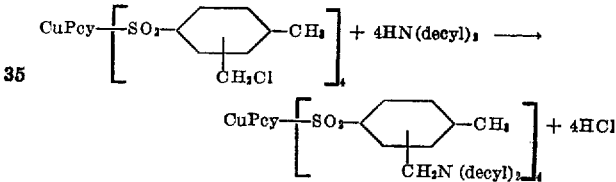

Ten grams of copper tetra (x-chloromethyl-4-tolylsulfonyl) phthalocyanine (U. S. P. 2,542,328, Example 4) were added to 100 g. of didecylamine while maintaining the temperature at 80–90° C. Heating at 130–140° C. for three hours, cooling to 80° C., diluting with 300 ml. of ethanol, washing with ethanol and then with acetone, yielded 11.6 g. of greenish-blue solid. Slurrying this solid product with 200 ml. of benzene, filtering off any insoluble material, concentrating and diluting with ethanol, gave 9 g. of pure copper tetra(x-[N,N-didecylamino] - methyl - 4 - tolylsulfonyl) phthalocyanine. This product possesses excellent solubility in hydrocarbon solvents and exhibits good fastness to light. It is of value as a dyestuff for gasoline, plastics, and inks.

*Example III*

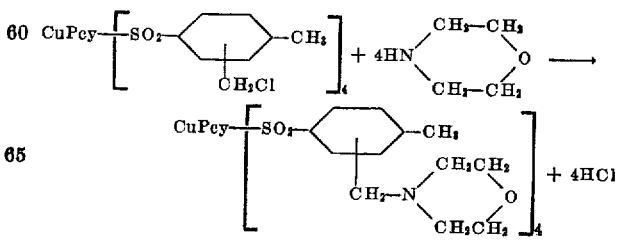

The procedure of Example II was repeated except that an equivalent amount of morpholine was substituted for the didecylamine. The product possesses good fastness to light but a slightly lower solubility in hydrocarbon solvents. It is of value as a dyestuff for certain plastics and inks.

Example IV

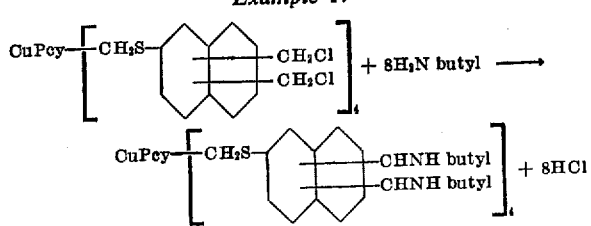

A stirred mixture of 15 g. of copper tetra(x,x-bis-chloromethylnaphthyl-β-mercaptomethyl) phthalocyanine and 200 g. of mono-butylamine was heated at 130–140° C. in an autoclave for five hours. After cooling to room temperature, the reaction mixture was taken up with 300 ml. of ethanol, filtered, washed and dried, yielding 14.2 g. of bluish-green solid product. The product is soluble in hydrocarbon solvents and possesses valuable properties for coloring gasoline, polystyrene, inks, etc. The starting phthalocyanine compound employed in this example may be prepared by reaction of 8 moles of bis-chloromethyl ether with 1 mole of copper tetra-naphthyl-β-thiomethyl phthalocyanine. The latter compound may be prepared by reaction of copper tetrachloromethyl phthalocyanine with 4 moles of an alkali-metal salt of β-mercaptonaphthalene.

In the procedures employed in the foregoing examples, suitable reaction temperature may range from 100 to 160° C. The reaction generally requires 3 to 5 hours. In addition to the amino compounds serving as the reagents, suitable reaction media include inert water-immiscible high-boiling solvents such as chlorobenene, dichlorobenzene, nitrobenzene, toluene, xylene, and the like. The solvents employed are preferably miscible with precipitant liquids such as alcohol or acetone. Alkaline materials such as sodium carbonate or potassium carbonate can be included when inert solvents are employed in the reaction media to absorb hydrogen chloride liberated by the reaction. Such inorganic hydrogen chloride acceptors are preferably used in an amount equivalent to the halogen present in the chloromethyl groups of the chloromethylated phthalocyanine derivative. When the reagent amine itself is employed as the reaction medium, the amount is preferably in excess of twice the equivalent of the replaceable chlorine in the chloromethyl groups of the phthalocyanine derivatives.

Various modifications and variations of this invention will be obvious to persons skilled in the art and it is to be understood that such modifications and variations are to be included within the purview of this application and the spirit and scope of the appended claims.

We claim:

1. A hydrocarbon-soluble phthalocyanine selected from the group consisting of metal and metal-free phthalocyanines containing from 6 to 16 aminomethyl groups as nuclear substituents of pendant aryl nuclei attached to phenylene nuclei of the fundamental phthalocyanine nucleus, each of said aminomethyl groups having no more than 1 hydrogen atom attached to the nitrogen atom thereof, and wherein the other radicals attached to the aminomethyl group contain no water-solubilizing groups, and at least 1 of said radicals contains at least 4 carbon atoms.

2. A hydrocarbon-soluble phthalocyanine, as defined in claim 1, in which the fundamental phthalocyanine nucleus is copper phthalocyanine.

3. A hydrocarbon-soluble phthalocyanine, as defined in claim 1, wherein each of said pendant aryl nuclei is attached to said phenylene nuclei through a divalent bridging link selected from the group consisting of —S—, —O—, —CO—, —SO₂—, —CH₂S—, —CH₂SO₂—, —CH₂O—, —CH₂CO—, —SO₂CH₂—, —SO₂NR—, —NRCO—, —NRSO₂— and —SO₂O— wherein R is a member of the group consisting of hydrogen and lower alkyl.

4. A compound of the formula

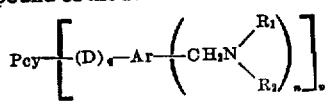

in which Pcy represents a fundamental phthalocyanine nucleus, D is a divalent bridging link selected from the group consisting of —S—, —O—, —CO—, —SO₂—, —CH₂S—, —CH₂SO₂—, —CH₂O—, —CH₂CO—, —SO₂CH₂—, —SO₂NR—, —NRCO—, —NRSO₂— and —SO₂O— wherein R is a member of the group consisting of hydrogen and lower alkyl, q has a value of 0 or 1, Ar represents a pendant aryl nucleus comprising no more than 10 cyclic carbon atoms, R₁ is a radical devoid of water-solubilizing substituents selected from the group consisting of hydrogen, alkyl, aralkyl, aryl, cycloalkyl, and heterocyclic radicals and part of a cycle when taken together with R₂, R₂ is a radical of at least four carbon atoms, devoid of water-solubilizing substituents, and selected from the group consisting of alkyl, aralkyl, aryl, cycloalkyl, and heterocyclic radicals, and part of a cycle when taken together with R₁, n has a value of 1 to 2, and p has a value of 1 to 8.

5. A compound of the formula

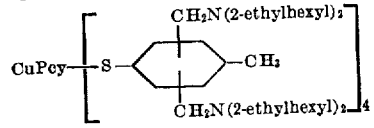

in which CuPcy is copper phthalocyanine.

6. A compound of the formula

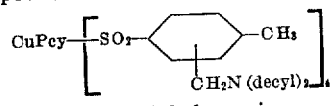

in which CuPcy is copper phthalocyanine.

7. A compound of the formula

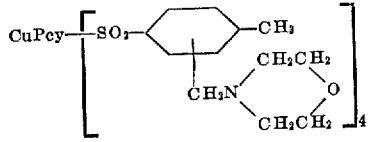

in which CuPcy is copper phthalocyanine.

8. A compound of the formula

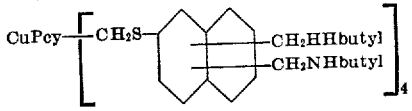

in which CuPcy is copper phthalocyanine.

9. A process which comprises heating a phthalocyanine selected from the group consisting of metal and metal-free phthalocyanines containing at least one chloromethyl group as a nuclear substituent of a pendant aryl nucleus attached to a phenylene nucleus of the fundamental phthalocyanine nucleus at a temperatuer of about 100 to 160° C. with a monamino compound containing at least one hydrogen attached to the amino nitrogen and containing no water-solubilizing groups, in an amount at least equivalent to the chlorine contained in the said chloromethyl groups.

10. A process as defined in claim 9 in which said fundamental phthalocyanine nucleus is copper phthalocyanine.

11. A process as defined in claim 9 in which said pendant aryl nucleus it attached to said phenylene nucleus through a divalent bridging link selected from the group consistnig of —S—, —O—, —CO—, —SO₂—, —CH₂S—, —CH₂SO₂—, —CH₂O—, —CH₂CO—, —SO₂CH₂—, —SO₂NR—, —NRCO—, —NRSO₂— and —SO₂O— wherein R is a member of the group consisting of hydrogen and lower alkyl.

12. A process as defined in claim 9 in which the reaction is carried out in the presence of an excess of the amino compound.

13. A process as defined in claim 9 in which the reaction mixture includes a hydrogen halide acceptor.

References Cited in the file of this patent

UNITED STATES PATENTS

| 2,414,374 | Haddock et al. | Jan. 14, 1947 |
| 2,430,052 | Haddock et al. | Nov. 4, 1947 |
| 2,542,328 | Haddock et al. | Feb. 20, 1951 |
| 2,547,972 | Randall et al. | Apr. 10, 1951 |
| 2,706,199 | Brentano | Apr. 12, 1955 |

FOREIGN PATENTS

| 1,029,457 | France | Mar. 4, 1953 |

UNITED STATES PATENT OFFICE
Certificate of Correction

Patent No. 2,795,584             June 11, 1957

Tellis A. Martin et al.

It is hereby certified that error appears in the printed specification of the above numbered patent requiring correction and that the said Letters Patent should read as corrected below.

Column 4, lines 2 to 7, Example 1, the formula should appear as shown below instead of as in the patent—

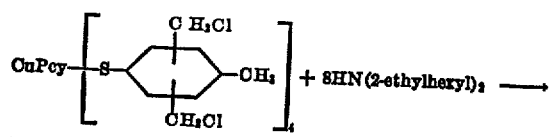

column 6, lines 47 to 51, claim 8, the formula should appear as shown below instead of as in the patent—

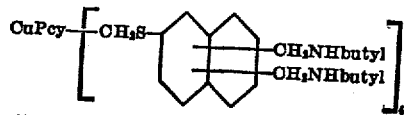

line 68, for "consistnig" read —consisting—.

Signed and sealed this 15th day of October 1957.

[SEAL]

Attest:
KARL H. AXLINE,
*Attesting Officer.*

ROBERT C. WATSON,
*Commissioner of Patents.*